US012222415B2

(12) United States Patent
Kletsov et al.

(10) Patent No.: US 12,222,415 B2
(45) Date of Patent: Feb. 11, 2025

(54) MOBILE DEVICE FOR DETECTING OBJECT AND OPERATION METHOD THEREFOR

(71) Applicant: Samsung Electronics Co., Ltd., Suwon-si (KR)

(72) Inventors: Andrey Vladimirovich Kletsov, Moscow (RU); Ekaterina Igorevna Semernya, Moscow (RU); Artem Yurievich Nikishov, Moscow (RU); Alexander Gennadievich Chernokalov, Moscow (RU); Anton Sergeevich Lukyanov, Moscow (RU); Dmitriy Sergeevich Zarshchikov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 17/692,915

(22) Filed: Mar. 11, 2022

(65) Prior Publication Data
US 2022/0196817 A1  Jun. 23, 2022

Related U.S. Application Data

(63) Continuation of application No. PCT/KR2020/007080, filed on Jun. 1, 2020.

(30) Foreign Application Priority Data

Sep. 13, 2019 (RU) .......................... RU2019128926
May 20, 2020 (KR) ........................ 10-2020-0060613

(51) Int. Cl.
*G01S 13/04* (2006.01)
*G01S 13/08* (2006.01)
*G01S 13/86* (2006.01)

(52) U.S. Cl.
CPC .............. *G01S 13/04* (2013.01); *G01S 13/08* (2013.01); *G01S 13/86* (2013.01)

(58) Field of Classification Search
None
See application file for complete search history.

(56) References Cited

U.S. PATENT DOCUMENTS

| 8,412,377 | B2 * | 4/2013 | Casey | ................... G05D 1/024 700/258 |
|---|---|---|---|---|
| 10,197,664 | B2 | 2/2019 | Richert | |

(Continued)

FOREIGN PATENT DOCUMENTS

| CN | 105512635 A | 4/2016 |
|---|---|---|
| CN | 109061625 A | 12/2018 |

(Continued)

OTHER PUBLICATIONS

Extended European Search Report dated Sep. 5, 2022, issued in European Application No. 20862358.7.

(Continued)

*Primary Examiner* — Vladimir Magloire
*Assistant Examiner* — David C. Schultz
(74) *Attorney, Agent, or Firm* — Jefferson IP Law, LLP

(57) ABSTRACT

An object detection method performed by a movable device is provided. The object detection method includes emitting radio frequency signals, receiving radio frequency signals reflected by an object, obtaining N sample sequences by digitizing N radio frequency signals, N being a natural number greater than or equal to 2, from among the received radio frequency signals, obtaining a matrix including each of the N sample sequences as a column, in an order in which the radio frequency signals are received, obtaining a resulting signal by summing samples for each row of the matrix and obtaining an energy value from the resulting signal, and (Continued)

detecting the object based on the obtained energy value being greater than or equal to a certain threshold value.

20 Claims, 8 Drawing Sheets

(56) References Cited

U.S. PATENT DOCUMENTS

| | | | |
|---|---|---|---|
| 10,228,439 B1* | 3/2019 | Olekas | G08B 13/2491 |
| 2015/0260828 A1 | 9/2015 | Ossowska | |
| 2016/0003946 A1 | 1/2016 | Gilliland et al. | |
| 2016/0274580 A1 | 9/2016 | Jung et al. | |
| 2016/0378117 A1* | 12/2016 | Szatmary | G06V 10/145 |
| | | | 382/153 |
| 2017/0023661 A1 | 1/2017 | Richert | |
| 2018/0083656 A1* | 3/2018 | Ray | H04B 1/0053 |
| 2018/0113216 A1* | 4/2018 | Kremer | G01S 17/42 |
| 2019/0041494 A1* | 2/2019 | Roger | G01S 7/003 |
| 2019/0155276 A1 | 5/2019 | Jung et al. | |
| 2019/0204847 A1 | 7/2019 | Noh et al. | |
| 2019/0227162 A1* | 7/2019 | Fembacher | G01S 13/9054 |

FOREIGN PATENT DOCUMENTS

| | | |
|---|---|---|
| EP | 0 974 851 A2 | 1/2000 |
| EP | 1 530 061 A2 | 11/2004 |
| JP | H07-049381 A | 2/1995 |
| KR | 10-2008-0061416 A | 7/2008 |
| KR | 10-1427391 B1 | 8/2014 |
| KR | 10-2019-0081316 A | 7/2019 |
| WO | 2019/127820 A1 | 7/2019 |

OTHER PUBLICATIONS

"Object Detection" (Apr. 16, 2019) (=https://www.youtube.com/watch?v=6Q1rqRHQ6BA&t=1s).
"Decibel" article (Wikipedia).
"Chebyshev filter" article (Wikipedia).
"Elliptical filter" article (Wikipedia).
"Bessel filter" article (Wikipedia).
Decision to Grant, dated Apr. 20, 2021, issued in Russian Application No. 2019128926.
Russian Office Action dated Feb. 3, 2020, issued in Russian Application No. 2019128926.
International Search Report dated Sep. 1, 2020, issued in International Application No. PCT/KR2020/007080.
European Intention to Grant, dated May 7, 2024, issued in European Application No. 20 862 358.7-1206.

* cited by examiner

MOBILE DEVICE FOR DETECTING OBJECT AND OPERATION METHOD THEREFOR

CROSS-REFERENCE TO RELATED APPLICATION(S)

This application is a continuation application, claiming priority under § 365(c), of an International application No. PCT/KR2020/007080, filed on Jun. 1, 2020, which is based on and claims the benefit of a Russian patent application number 2019128926, filed on Sep. 13, 2019, in the Russian Intellectual Property Office, and of Korean patent application number 10-2020-0060613, filed on May 20, 2020, in the Korean Intellectual Property Office, the disclosure of each of which is incorporated by reference herein in its entirety.

BACKGROUND

1. Field

The disclosure relates to a movable device for detecting an object and an operating method. More particularly, the disclosure relates to a movable device for detecting a low-profile object by using a radio frequency signal, and an operating method of the movable device.

2. Description of Related Art

Object detection technology is widely used in robotics. There are technical solutions that detect an object by using radar, an optical sensor using structured light, an ultrasonic sensor, a radio frequency (RF) sensor, such as a millimeter-wave scanning radar, etc. The known technical solutions may be principally used in detecting high-profile objects with a high resolution. These technical solutions are known, for example, from the following related art.

The related art proposes a cleaning robot, comprising a front-obstacle sensing unit configured to transmit a front-sensing radio wave toward the front of a main body and detect a front-reflected radio wave reflected from a front obstacle and a controller configured to detect location information of the front obstacle based on the front-reflected radio wave, wherein the front-obstacle sensing unit comprises at least two ultra-wide band radar sensors configured to transmit an impulse radio wave.

However, the proposed technical solution does not provide detection of low-profile objects and does not protect against false alarms or false object detections by filtering background noise and distinguishing between the floor and objects on the floor.

Other related art proposes a technical solution, wherein broadband signal transmission may be used for object detection and/or range setting. Broadband transmission may comprise a pseudo-random bit sequence or a bit sequence produced using a random process. The sequence may be used to modulate transmission of a given wave type. Various types of waves, such as pressure, light, and radio waves, may be used. Waves reflected by objects within the sensing volume may be sampled. A received signal may be convolved with a time-reversed copy of a transmitted random sequence to produce a correlogram. The correlogram may be analyzed to determine a range of an object. The analysis may comprise determination of one or more peaks/troughs in a correlogram. A range with respect to an object may be determined based on a time lag of each peak.

However, the proposed technical solution does not provide detection of low-profile objects and does not protect against false alarms/object detections by filtering background noise and distinguishing between objects on the floor and objects under the floor.

With the related art, it is not possible to detect low-profile objects, which may impede movement of a movable device, such as a robot. In addition, a device may erroneously detect an object due to background noise and objects located beneath a surface along which the device moves, such as pipes, wires, cables, metal structures, etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of detecting a low-profile object by using an RF sensor and a movable device for performing the method.

Another aspect of the disclosure is to provide energy obtained from RF reflection signals reflected from an object, and an object may be detected based on whether the energy exceeds a threshold, to detect a low-profile object having a low profile.

According to various embodiments, by removing at least one of background noise and a signal due to an object existing beneath a surface on which a movable device moves, object detection accuracy of the movable device may be increased.

Additional aspects will be set forth in part in the description which follows and, in part, will be apparent from the description, or may be learned by practice of the presented embodiments.

In accordance with an aspect of the disclosure, a movable device for detecting an object is provided. The movable device includes an RF signal transmitter emitting radio frequency signals, an RF signal receiver receiving radio frequency signals reflected by an object, a memory storing one or more instructions, and a processor configured to execute the one or more instructions stored in the memory, wherein, by executing the one or more instructions, the at least one processor is configured to obtain N sample sequences by digitizing N radio frequency signals, N being a natural number greater than or equal to 2, from among the received radio frequency signals, obtain a matrix including each of the N sample sequences as a column in an order in which the N sample sequences are received, obtain a resulting signal by summing samples for each row of the matrix, obtain an energy value from the resulting signal, and detect the object based on the obtained energy value being greater than or equal to a certain threshold value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
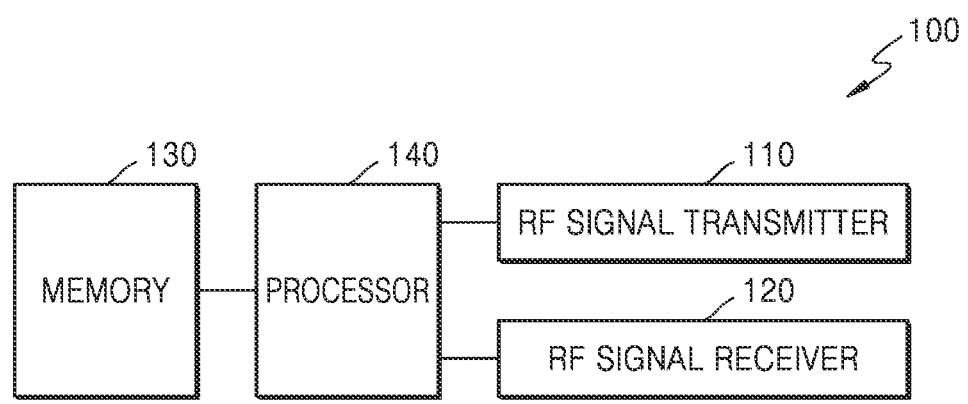
FIG. 1 is an internal block diagram of a movable device 100 according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an embodiment, in accordance with the energy value being equal to or less than the certain threshold value, the at least one processor may be configured to modify the matrix by excluding a sample sequence included in a first column of the matrix, and including a sample sequence column obtained from a radio frequency signal received after a last column of the matrix.

In an embodiment, the at least one processor may be further configured to obtain a velocity of the movable device, and obtain, from the velocity of the movable device, a distance from the movable device to the object, to detect that the object is within the obtained distance.

In an embodiment, the at least one processor may be further configured to obtain a velocity of the movable device, and remove noise by filtering samples included in each row of the matrix, by using a filter having a certain cut-off frequency, and obtain the energy value by summing the samples, from which the noise is removed.

In an embodiment, the certain cut-off frequency may be obtained according to Formula $$F_{low} = \frac{c \times FPS}{2 \times U \times F_S},$$

where $F_{low}$ is a cut-off frequency of the filter, c is the speed of light, FPS is a number of radio frequency (RF) signals received per second, U is the velocity of the movable device, and Fs is a sampling frequency of the received radio frequency signals.

In an embodiment, the at least one processor may be further configured to individually filter each row included in the matrix by using the filter having the certain cut-off frequency.

In an embodiment, the at least one processor may be further configured to remove, by using the filter, at least one of a signal from an object located beneath a surface, on which the movable device moves, and a vibration noise signal of the movable device.

In an embodiment, the at least one processor may be further configured to determine a direction of the object by using the received radio frequency signals and correct the cut-off frequency to $$F_{low} = \frac{c \times FPS}{2 \times U \times \cos(A) \times F_S}$$

according to the direction of the object, where A is an angle between the direction of the object and a moving direction in which the movable device moves.

In an embodiment, the at least one processor may be further configured to detect a location of the object by using the moving velocity and the angle A.

In an embodiment, the movable device may further include an additional sensor for detecting an object, wherein the additional sensor may include one or more of a camera, a time-of-flight camera, a structured backlight camera, an ultrasonic sensor, and a capacitive sensor.

An object detection method performed by a movable device, according to an embodiment, includes: emitting radio frequency signals; receiving the radio frequency signals reflected by an object; obtaining N sample sequences by digitizing N radio frequency signals (N is a natural number of 2 or more) from among the received radio frequency signals; obtaining a matrix including each of the N sample sequences as a column, in an order in which the radio frequency signals are received; obtaining a resulting signal by summing samples for each row of the matrix and obtaining an energy value from the resulting signal; and detecting an object in accordance with the energy value being greater than or equal to a certain threshold value.

A computer-readable recording medium according to an embodiment may be a computer-readable recording medium having recorded thereon the object detection method, the method including: emitting radio frequency signals; receiving the radio frequency signals reflected by an object; obtaining N sample sequences by digitizing N radio frequency signals, N being a natural number greater than or equal to 2, from among the received radio frequency signals; obtaining a matrix including each of the N sample sequences as a column in an order in which the N sample sequences are received; obtaining a resulting signal by summing samples for each row of the matrix; obtaining an energy value from the resulting signal; and detecting the object based on the obtained energy value being greater than or equal to a certain threshold value.

According to the movable device for detecting an object and the method thereof, according to an embodiment, a low-profile object may be detected by obtaining energy from RF reflected signals reflected by the object and detecting the object according to whether the energy exceeds a threshold value.

According to the movable device for detecting an object and the method thereof, according to an embodiment, at least one of background noise and a signal due to an object existing beneath a surface, on which the movable device moves, may be removed by using a filter having a certain cut-off frequency.

Hereinafter, embodiments of the disclosure are described more fully with reference to the accompanying drawings, in which the embodiments of the disclosure are shown such that one of ordinary skill in the art may easily work the disclosure. The disclosure may, however, be embodied in many different forms and should not be construed as limited to the embodiments set forth herein. Accordingly, it is obvious to those skilled in the art that various amendments and modifications may be made to the various embodiments described herein without departing from the scope of the disclosure. In addition, description of well-known functions and constructions may be omitted for clarity and brevity.

The terms and wording used in the following description and claims are not limited to bibliographic meanings, but simply used by the author of the disclosure to provide a clear and consistent understanding of the application. Accordingly, it should be apparent to those skilled in the art that the following description of various embodiments of the application is provided for illustration only.

Additionally, it should be understood that the terms "comprises," "comprising," "includes" and/or "including," as used herein, mean the presence of the features, values, operations, elements and/or components. But do not exclude the presence or addition of one or more other features, values, operations, elements, components and/or groups thereof.

The terms used in the disclosure are described as those general terms currently widely used in the art in consideration of functions in regard to the disclosure, but the terms may vary according to the intention of those of ordinary skill in the art, precedents, or new technology in the art. Thus, the terms used in the disclosure should be interpreted not as the names of the terms but based on the meaning of the terms and the overall description of the disclosure.

The terms used in the disclosure are merely used to describe particular embodiments, and are not intended to limit the disclosure.

Throughout the specification, it will also be understood that when an element is referred to as being "connected to" another element, it can be directly connected to the other element, or it can be electrically connected to the other element and intervening elements may be present.

Finally, the steps of all methods described herein can be performed in any suitable order unless otherwise indicated herein or otherwise clearly contradicted by context. The disclosure is not limited to the order in which the steps are described.

Phrases such as "in some embodiments" or "in embodiments" appearing in various parts of the specification are not necessarily all referring to the same embodiment.

Some embodiments of the disclosure may be described in terms of functional block components and various processing steps. Such functional blocks may be realized by any number of hardware and/or software components configured to perform the specified functions. For example, the functional blocks of the disclosure may be implemented by one or more microprocessors, or may be implemented by circuit configurations for a given function. Also, for example, the functional blocks of the disclosure may be implemented using various programming or scripting languages. The functional blocks may be implemented in algorithms that are executed on one or more processors. In addition, the disclosure may employ prior art for electronic environment configuration, signal processing, and/or data processing, and the like. Terms such as "mechanism," "element," "means" and "configuration" may be used broadly and are not limited to mechanical and physical components.

Furthermore, the connecting lines, or connectors shown in the drawings are intended to represent functional relationships and/or physical or logical couplings between the various elements. It should be noted that many alternative or additional functional relationships, physical connections or logical connections may be present in a practical device.

The terms such as " . . . unit," "module" described in the specification refer to units that perform at least one function or operation, and the units may be implemented as hardware or software or as a combination of hardware and software.

Also, the term "user" refers to a person who uses the movable device according to its function, and may include a consumer, a manager, or an installation engineer.

Hereinafter, the disclosure is described with reference to accompanying drawings.

FIG. 1 is an internal block diagram of a movable device 100 according to an embodiment of the disclosure.

Referring to FIG. 1, the movable device 100 may include an RF signal transmitter 110, an RF signal receiver 120, a memory 130, and a processor 140.

In an embodiment, the movable device 100 may be an electronic device capable of detecting an object while moving. The movable device 100 may be moved manually according to the control by a user or may move via autonomous driving according to an automatic mode. The movable device 100 may be any device, the operation of which requires detection of an object.

In an embodiment, the movable device 100 may include the RF signal transmitter 110 and the RF signal receiver 120. In an embodiment, the RF signal transmitter 110 and/or the RF signal receiver 120 may be mounted in a front where the movable device 100 moves, but are not limited thereto. The RF signal transmitter 110 may emit a broadband radio frequency (RF) signal to its surroundings. The RF signal receiver 120 may receive an RF signal reflected from an object. The RF signal transmitter 110 and the RF signal receiver 120 may be arranged apart from each other by a certain interval and formed in the movable device 100, but are not limited thereto.

The memory 130 according to an embodiment may store at least one instruction. The memory 130 may store at least one program executed by the processor 140. In addition, the memory 130 may store data input to the movable device 100 or output from the movable device 100.

The memory 130 may include at least one type of storage medium from among a flash memory type, a hard disk type, a multimedia card micro type, a card type memory (e.g., secure digital (SD) or extreme digital (XD) memory, etc.), random access memory (RAM), static random access memory (SRAM), read-only memory (ROM), electrically erasable programmable read-only memory (EEPROM), programmable read-only memory (PROM), magnetic memory, a magnetic disk, and an optical disk.

The processor 140 may control the overall operation of the movable device 100. The processor 140 may control, by executing one or more instructions stored in the memory 130, the movable device 100 to function.

In an embodiment, the processor 140 may emit a radio frequency signal through the RF signal transmitter 110 by executing one or more instructions stored in the memory 130, and detect an object by using an RF signal reflected by the object and received by the RF signal receiver 120.

The movable device 100 needs to detect not only tall objects, but also a low-height object. When a liquid is spilled on a surface on which the movable device 100 moves, or there is an object such as a cable wire, wire, or pipe, it is necessary to detect the same. Hereinafter, an object having a height/diameter of less than 1 cm is referred to as a low-profile object.

When a distance between the RF signal transmitter 110 or the RD signal receiver 120 and an object is much greater than a distance between the RF signal transmitter 110 and the RF signal receiver 120, RF signals reflected from different points of the object arrive at the RF signal receiver 120 essentially simultaneously and form a total reflected signal having one large peak indicating the presence of the object.

However, in the case of a low-profile object, such as a wire, cable or pipe, which has a long length and a short diameter, RF signals reflected from different points of the object arrive at the RF signal receiver 120 at different times, and form a total reflected signal having several small peaks. A reflected signal having several small peaks is generally considered as noise, and the above reflected signal may not be used to detect an object. Accordingly, the movable device 100 may not accurately detect a low-profile object having a low height.

In an embodiment, the processor 140 uses the energy of the RF reflected signals to detect such a low-profile object.

In an embodiment, the processor 140 may obtain N sample sequences by digitizing a certain number of radio frequency signals from among radio frequency signals received by the RF signal receiver 120, for example, N radio frequency signals, N being a natural number greater than or equal to 2. Here, N is the number of reflected RF signals in a set and may be preset.

The processor 140 may obtain a matrix including each of the N sample sequences as a column. Here, each column may be arranged in the order in which radio frequency signals are received.

The processor 140 may obtain a resulting signal by summing samples for each row of the matrix. The processor 140 may obtain a whole energy value of the resulting signal by summing samples of the resulting signal. When the energy value is greater than or equal to a certain threshold value, the processor 140 may detect a corresponding object.

In an embodiment, when the energy value is less than the certain threshold value, the processor 140 does not detect the corresponding object. In this case, the processor 140 may modify the matrix by excluding the sample sequences included in a first column of the matrix and including a sample sequence column obtained from an N+1-th radio frequency signal reflected from the object. Thereafter, the processor 140 may repeat the above-described operation.

Radio frequencies have larger wavelengths than an optical sensor. Thus, the radio frequency signal passes through a floor surface and detects both objects on the surface and objects under the surface. In this case, the movable device 100 may erroneously detect an object due to misdetection of a radio frequency. Thus, the movable device 100 using a radio frequency needs to eliminate the effect of detection of objects that are beneath the surface. Objects located beneath the surface on which the movable device 100 moves may include, for example, pipes, wires, cables, metal structures and the like under the floor.

Also, the movable device 100 may be affected by motor vibration or various floor conditions. For example, a material of the floor on which the movable device 100 moves affects the intensity of background noise. In addition, the material of the floor affects a signal reflected from objects located beneath the floor. Therefore, it is necessary to remove background noise and the like.

In an embodiment, after obtaining a matrix, the processor 140 may remove noise by filtering samples included in each row of the matrix by using a band filter having a certain cut-off frequency. To this end, the processor 140 may obtain a velocity of the movable device 100 and obtain a certain cut-off frequency by using the obtained velocity. The processor 140 may obtain an energy value by summing samples, from which noise has been removed, and when the energy value is greater than or equal to a certain threshold value, the processor 140 may detect a corresponding object.

In an embodiment, when c is the light speed, FPS is a number of RF signals received per one second, U is a velocity of the movable device, and Fs is a sampling frequency of a received radio frequency signal, the processor 140 may obtain a cut-off frequency $F_{low}$ of a filter, according to Formula $$F_{low} = \frac{c \times FPS}{2 \times U \times F_S}.$$

In an embodiment, by filtering a signal by using a band filter having a certain cut-off frequency, the processor 140 may remove at least one of a signal from an object located beneath the surface, on which the movable device 100 moves, or a vibration noise signal of the movable device 100.

In an embodiment, the processor 140 may obtain a resulting signal by summing samples of the matrix filtered by the filter having a cut-off frequency, for each row. The processor 140 may obtain a whole energy value of the resulting signal by summing samples of the resulting signal. When the energy value is greater than or equal to a certain threshold value, the processor 140 may detect a corresponding object.

In an embodiment, the processor 140 may detect, from the velocity of the movable device 100, a location of an object by obtaining a separation distance between the movable device 100 and the object.

In an embodiment, the movable device 100 may include at least two RF signal transmitters 110 and at least two RF signal receivers 120. The at least two RF signal transmitters 110 may emit a broadband radio frequency signal. The processor 140 may determine an object direction of the movable device 100 by using reflected radio frequency signals. When A is an angle between the direction of the object and a moving direction in which the movable device moves, the processor 140 may modify the cut-off frequency to $$F_{low} = \frac{c \times FPS}{2 \times U \times \cos(A) \times F_S}$$

according to the direction of the object.

In an embodiment, the processor 140 may detect the location of the object with respect to the movable device 100 by using a moving velocity of the movable device 100 and the angle between the direction of the object and the moving direction of the movable device 100.

In an embodiment, the movable device 100 may further include one or more additional sensors (not shown) for detecting an object. The one or more additional sensors may include one or more of a camera, a time-of-flight camera, a structured backlight camera, an ultrasonic sensor, or a capacitive sensor.

Figure 2:
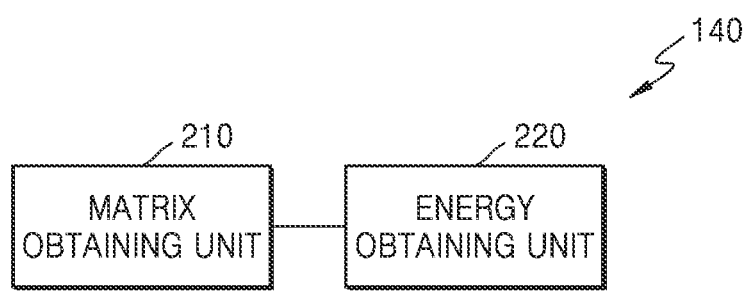
FIG. 2 is an internal block diagram of a processor 140 according to an embodiment of the disclosure.

FIG. 2 is an internal block diagram of the processor 140 according to an embodiment of the disclosure.

Referring to FIG. 2, the processor 140 may include a matrix obtaining unit 210 and an energy obtaining unit 220. The matrix obtaining unit 210 may form a set with a certain number of RF signals that are reflected by an object and received by the RF signal receiver 120, for example, N radio frequency signals. The matrix obtaining unit 210 may form a set of reflected RF signals in the order in which the RF signals are received. The matrix obtaining unit 210 may digitize the set of reflected RF signals. That is, the matrix obtaining unit 210 may obtain a sample sequence by sampling and digitizing the RF signal and converting the sample into a digital form. Each digitized RF signal in the set is a sequence of samples. Since RF signal digitization is well-known in the art, a detailed description thereof will be omitted.

The matrix obtaining unit 210 may form a combined signal from the digitized RF signal set. The combined signal is a matrix, which may consist of a set of digitized RF signals, wherein each column included in the matrix is a sequence of samples of the digitized RF signal. The matrix may include a total of N columns, and the digitized RF signals of the matrix are arranged from the first column to the Nth column in the order they are received.

A first row of the matrix may include a first sample of each digitized RF signal in the set. Likewise, a second row of the matrix may include a second sample of each digitized RF signal in the set.

The energy obtaining unit 220 may form a resulting signal from the combined signal. The energy obtaining unit 220 may obtain a combined signal, that is, a resulting signal by summing samples in each row of the matrix. The energy obtaining unit 220 may calculate whole energy of the resulting signal by summing each sample of the resulting signal.

As described above, for a low-profile object, such as a wire, cable, or pipe, the width or length of which is much larger than the height or diameter thereof, RF signals reflected from different points of an object are reflected signals with several small peaks, and arrive at the RF signal receiver 120 at different times.

In an embodiment, the energy obtaining unit 220 may receive a reflected signal having several small peaks over a certain period of time and combine the same to form whole energy. In general, a reflected signal having several small peaks is regarded as background noise and is not used for object detection. However, in an embodiment, whole energy may be calculated by summing reflected signals, and an object may be detected using the whole energy. As described above, according to an embodiment, the energy obtaining unit 220 may obtain energy from RF signals reflected over a certain period of time and detect an object by using the energy, thereby performing adaptive object detection according to a distance between the movable device 100 and the object.

The processor 140 may detect an object by comparing the whole energy calculated by the energy obtaining unit 220, with a predetermined threshold value. When the whole energy is higher than the predetermined threshold value, the processor 140 may detect an object. The threshold value may be calculated empirically or experimentally in a factory test stage with respect to a material of a surface on which the movable device 100 moves. Before the movable device 100 is operated, a user may set a threshold value by selecting a threshold value corresponding to the material of the surface in settings of the movable device 100.

Alternatively, the movable device 100 may automatically set a threshold value while moving for a certain period of time, on a surface, on which there are no obstacles. For example, the movable device 100 having the RF signal transmitter 110 and the RF signal receiver 120 mounted thereon may be arranged in a certain area without any obstacles/objects, for example, in a space area at a distance of 0.5 m to 1 m in width and length, respectively, and perform the above-described method so as to receive an RF signal in a state in which any object other than low-profile objects has make an impact. The movable device 100 may detect a low-profile object through the RF signal receiver 120 while moving within this space area. The whole energy obtained by the movable device 100 by performing the above-described method while moving within the space area of a distance of 0.5 m-1 m where there are no obstacles/objects may be set as a threshold value.

When the whole energy is less than or equal to a predetermined threshold value, the matrix obtaining unit 210 may exclude, from the set, RF signals received earlier than the others, from among N columns included in an existing matrix, and digitize an RF signal received immediately after receiving the RF signal last and include the same in the set to obtain a matrix including N columns again. That is, the matrix obtaining unit 210 may modify the matrix by moving each column of the matrix one by one to the left by excluding RF signals from the matrix, in the order in which the signals are received, one by one, starting with an RF signal received first.

The energy obtaining unit 220 may repeat the above-described method for the modified matrix. That is, the energy obtaining unit 220 may obtain a resulting signal by summing samples in each row of the modified matrix, and calculate energy by using the summed samples.

In an embodiment, the processor 140 may obtain energy by repeating the above-described method several times. The processor 140 may increase the accuracy of the result by obtaining an average value of the energy obtained according to the above-described method and comparing the average value with a threshold value.

Figure 3:
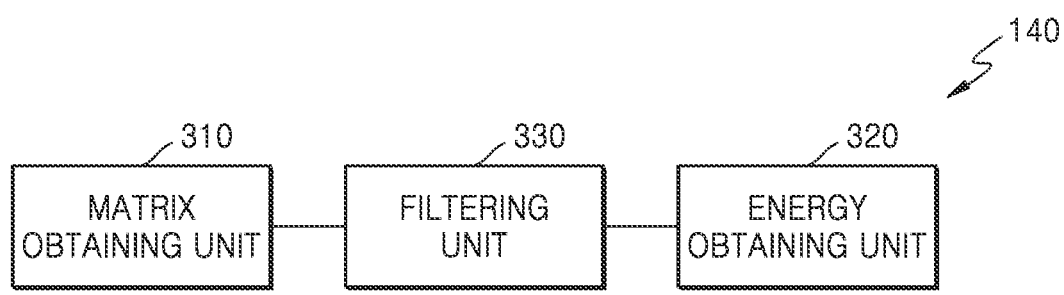
FIG. 3 is an internal block diagram of the processor 140 according to an embodiment of the disclosure.

FIG. 3 is an internal block diagram of the processor 140 according to an embodiment of the disclosure.

Referring to FIG. 3, the processor 140 may further include a filtering unit 330 in addition to a matrix obtaining unit 310 and an energy obtaining unit 320.

The matrix obtaining unit 310 and the energy obtaining unit 320 of FIG. 3 have the same functions as the matrix obtaining unit 210 and the energy obtaining unit 220 of FIG. 2, respectively, and thus, a redundant description thereof is omitted.

Referring to FIG. 3, the filtering unit 330 may remove noise that may affect detection of an object. Noise is a signal that affects detection of an object by the movable device 100, and may include, for example, at least one of a signal from an object located beneath the surface on which the movable device 100 moves or a noise signal generated while the movable device 100 vibrates while moving.

The movable device 100 has different access velocities depending on whether an object is located beneath the surface or above the surface. For example, a velocity at which the movable device 100 approaches the object located above the surface may be greater than a velocity at which the movable device approaches the object located beneath the surface. In an embodiment, the movable device 100 may use a difference in the velocities from the movable device to the object to distinguish the object located beneath the surface from the object located above the surface.

In an embodiment, according to a velocity at which the movable device 100 approaches an object, a sampling frequency rate, that is, a frame rate of an RF signal received per one second may vary. Thus, by using the sampling frequency rate, whether a corresponding object is an object located beneath the surface or the object located above the surface may be determined. In an embodiment, the movable device 100 may distinguish a sampling frequency rate to distinguish the object located beneath the surface from the object located above the surface.

Background noise may include noise generated due to vibration of the movable device 100 while the movable device 100 is moving. The vibration noise may be, for example, a high frequency signal. In this case, in an embodiment, the filtering unit 330 may remove the vibration noise, which is a high frequency signal, by filtering a signal by using a low-band filter.

The filtering unit 330 may filter a matrix obtained by the matrix obtaining unit 310, by using a band pass filter or a low pass filter. The filtering unit 330 may filter a matrix by using one or more of various digital pass filters, for example, a Chebyshev filter, an elliptical filter, a Bessel filter, or a Butterworth filter.

The filtering unit 330 may remove noise by filtering the matrix by a filter having a certain cut-off frequency calculated to remove noise. The filtering unit 330 may calculate a cut-off frequency of the filter by using the velocity of the movable device 100. The filtering unit 300 may obtain the cut-off frequency of the filter according to Formula $$F_{low} = \frac{c \times FPS}{2 \times U \times F_S}$$

by using the velocity of the movable device 100 and the digital signal. Here, $F_{low}$ is the cut-off frequency of the low-pass filter, c is the light speed, FPS is the number of RF signals received per one second, U is the velocity of the movable device 100, and Fs is the sampling frequency of the received RF signal.

In an embodiment, the filtering unit 330 may filter the combined signal in a row direction, by using a filter having a cut-off frequency calculated to remove noise. The filtering unit 330 may filter the combined signal row-wise. The filtering unit 330 may separately filter each row of the matrix.

In an embodiment, the energy obtaining unit 320 may obtain a resulting signal by summing samples of each row of the matrix, from which noise has been removed by filtering by the filtering unit 330, and may obtain whole energy therefrom. The energy obtaining unit 320 may detect an object based on whether the obtained energy is greater than a threshold value.

As described above, according to an embodiment, an object may be detected by generating a matrix by using a radio frequency signal, filtering the matrix to remove noise, and calculating the whole energy of the signal from which the noise is removed.

In an embodiment, to further reduce a probability that an alarm is false or a probability that an object is not detected, the processor 140 may process signals by sequentially performing the above method multiple times on each set of reflected RF signals. By repeating the above method for the reflected RF signal set, the processor 140 may improve a signal-to-noise ratio due to signal averaging. In addition, according to the above, background noise may be removed more effectively.

In an embodiment, when an object is at a location deviating from an axis indicating the moving direction of the moving device 100, the filtering unit 330 may correct and use the cut-off frequency according to the location of the object. The movable device 100 may include at least two RF signal transmitters 110 and RF signal receivers 120. The at least two RF signal transmitters 110 may emit a broadband RF signal, and the at least two RF signal receivers 120 may receive a reflected RF signal.

The filtering unit 330 may determine a direction of the movable device 100 with respect to the object by using the reflected RF signal. Determining a direction of an object by emitting a signal and receiving a signal reflected from the object is widely known in the field of radar, and thus, a detailed description of this operation is not necessary.

When A is an angle between an axis indicating the direction in which the moving device 100 moves and an axis connecting a central point of the object and the moving device 100, and when the object is located in front of the movable device 100, A is 0 degrees, but when the object is in a location deviating from the moving direction of the moving device 100, the angle A has a non-zero value.

In this case, the filtering unit 330 may correct the cut-off frequency to $$F_{low} = \frac{c \times FPS}{2 \times U \times \cos(A) \times F_S}.$$

The filtering unit 330 may filter a matrix by using a filter having a corrected cut-off frequency.

In another embodiment, the processor 140 may use the velocity of the movable device 100 having an RF sensor mounted thereon, to detect a low-profile object with the RF sensor. The processor 140 may further include an operation of calculating a distance from the movable device 100 having the RF sensor mounted thereon, to the object, by using the velocity of the movable device 100. To this end, the processor 140 may calculate the distance from the movable device 100 to the object by using a time that a signal arrives at the object from the RF signal transmitter 110 mounted on the movable device 100 and is reflected therefrom and received by the RF signal receiver 120 and using the velocity of the movable device 100. The processor 140 may detect that a low-profile object is located apart by the calculated certain distance, by calculating the distance to the object. Calculating a distance to an object by emitting a signal and receiving the signal reflected from the object is widely known in the field of radar, and thus, a detailed description of this operation is not necessary.

In another embodiment, to detect a low-profile object by using an RF sensor, the processor 140 may calculate a location of an object with respect to the movable device 100 by using the velocity of the movable device 100 and an angle between a direction of the object and the moving direction of the movable device 100. Calculating a location of an object with respect to the movable device 100 by using the velocity of the movable device 100 having a radar mounted thereon and an angle between a direction of the object and the moving direction of the movable device 100 is widely known, and thus, a detailed description thereof is omitted.

In another embodiment, the movable device 100 may further include one or more additional sensors in addition to the RF sensor. The movable device 100 may detect an object by using one or more additional sensors to further increase a probability of detecting a low-profile object. The one or more additional sensors may include one or more of a camera, a time-of-flight camera, a structured backlight camera, an ultrasonic sensor, or a capacitive sensor.

Figure 4:
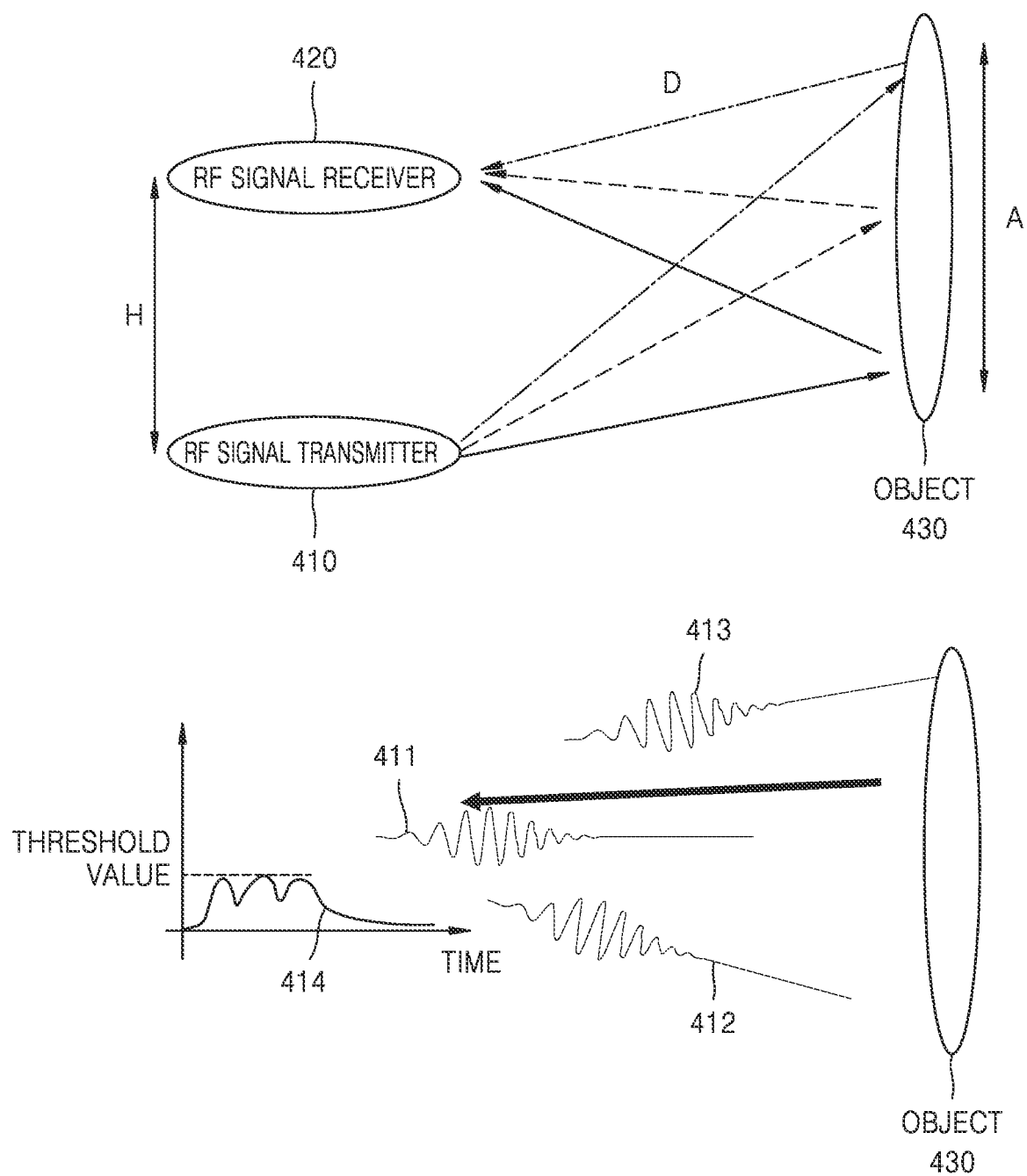
FIG. 4 is a diagram for describing detecting of an object by using energy, according to an embodiment of the disclosure.

FIG. 4 is a diagram for describing detecting of an object by using energy, according to an embodiment of the disclosure.

FIG. 4 illustrates a low-profile object 430. The low-profile object 430 is an object having a long length A and a low height, such as a wire, cable, or pipe. When the object is the low-profile object 430, it is difficult to detect the low-profile object 430 with a general convolutional or envelope approach.

Referring to FIG. 4, a distance from the RF signal transmitter 110 or receiver 120 to the low-profile object 430 may be compared with a distance D between the RF signal transmitter 110 and the RF signal receiver 120, and may also be compared with a length of the object. Because the length A of the low-profile object 430 is greater than a distance H from an RF signal transmitter 410 to an RF signal receiver 420, an RF signal reflected from different points of the low-profile object 430 become reflected signals 411, 412, and 413 having several small peaks. In this case, the several reflected signals 411, 412, and 413 reflected from the different points of the low-profile object 430 do not simultaneously arrive at the RF signal receiver 420, but arrive at the RF signal receiver 420 over a certain period of time, at different times. A reflected signal having several small peaks generally has a small value and is thus considered as noise, and thus, the above reflected signal may not be used to detect an object.

In an embodiment, the movable device 100 may form whole energy 414 by using the reflected signals 411, 412, 413 having several small peaks to prevent the reflected signals 411, 412, 413 from being regarded as background noise. Instead of using an instantaneous peak signal, the movable device 100 may combine all the reflected signals 411, 412, and 413 received for a certain period of time, to form the energy 414 for a certain period of time. The reflected signals 411, 412, and 413 having several small peaks are considered as background noise and are not used to detect the object 430, but when the whole energy 414 having a large magnitude is calculated by adding the reflected signals, the whole energy may be used to detect an object.

The movable device 100 may detect an object by comparing the energy 414 to a predetermined threshold value.

Figure 5:
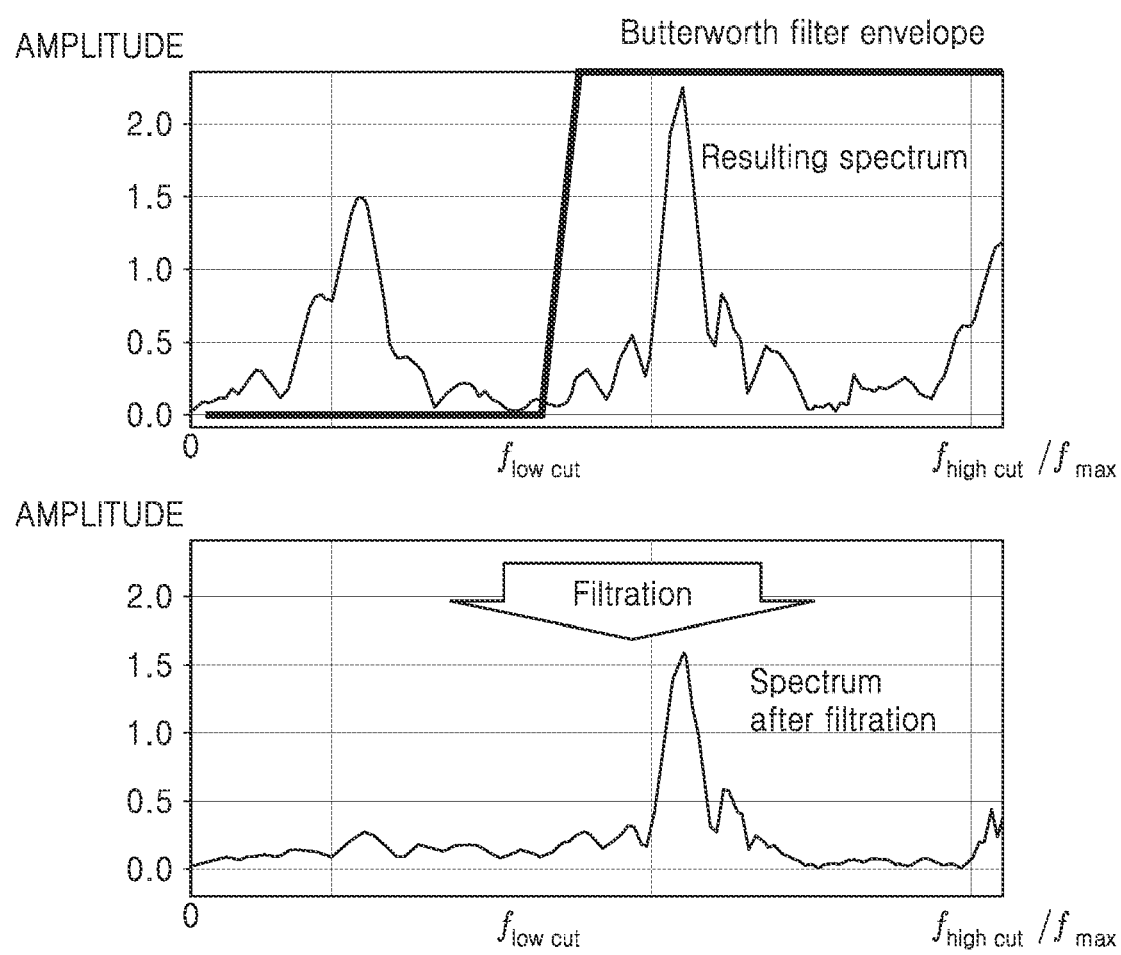
FIG. 5 is a diagram for describing noise removal by using a filter, according to an embodiment of the disclosure.

FIG. 5 is a diagram for describing noise removal by using a filter, according to an embodiment of the disclosure.

Referring to FIG. 5, the graph shows the amplitude of a signal according to a frequency. The upper graph of FIG. 5 shows a signal received by the RF signal receiver 120 before the filtering unit 330 removes noise, and the lower graph of FIG. 5 shows a signal after the filtering unit 340 has removed noise.

In an embodiment, the filtering unit 330 may remove noise by using Butterworth filtering which is designed so that its amplitude-frequency response is as smooth as possible. The noise may include at least one of a signal from an object located beneath the surface and a vibration noise signal of the movable device 100.

The filtering unit 330 may obtain a cut-off frequency to remove noise, and filter the RF signal by using a filter having the obtained cut-off frequency value.

The cut-off frequency $F_{low}$ of the filter used by the filtering unit 330 may be obtained as $$F_{low} = \frac{c \times FPS}{2 \times U \times F_S}$$

by experiments, when c is the light speed, FPS is the number of RF signals received per one second, U is the velocity of the movable device 100, and Fs is the sampling frequency of the received radio frequency signal.

Comparing the upper graph to the lower graph of FIG. 5, it can be seen that in the lower graph, noises of frequencies lower than the cut-off frequency are removed from the RF signal. Also, in the lower graph, it can be seen that the amplitude value of a signal passing through the RF signal is mitigated according to the Butterworth filter.

Figure 6:
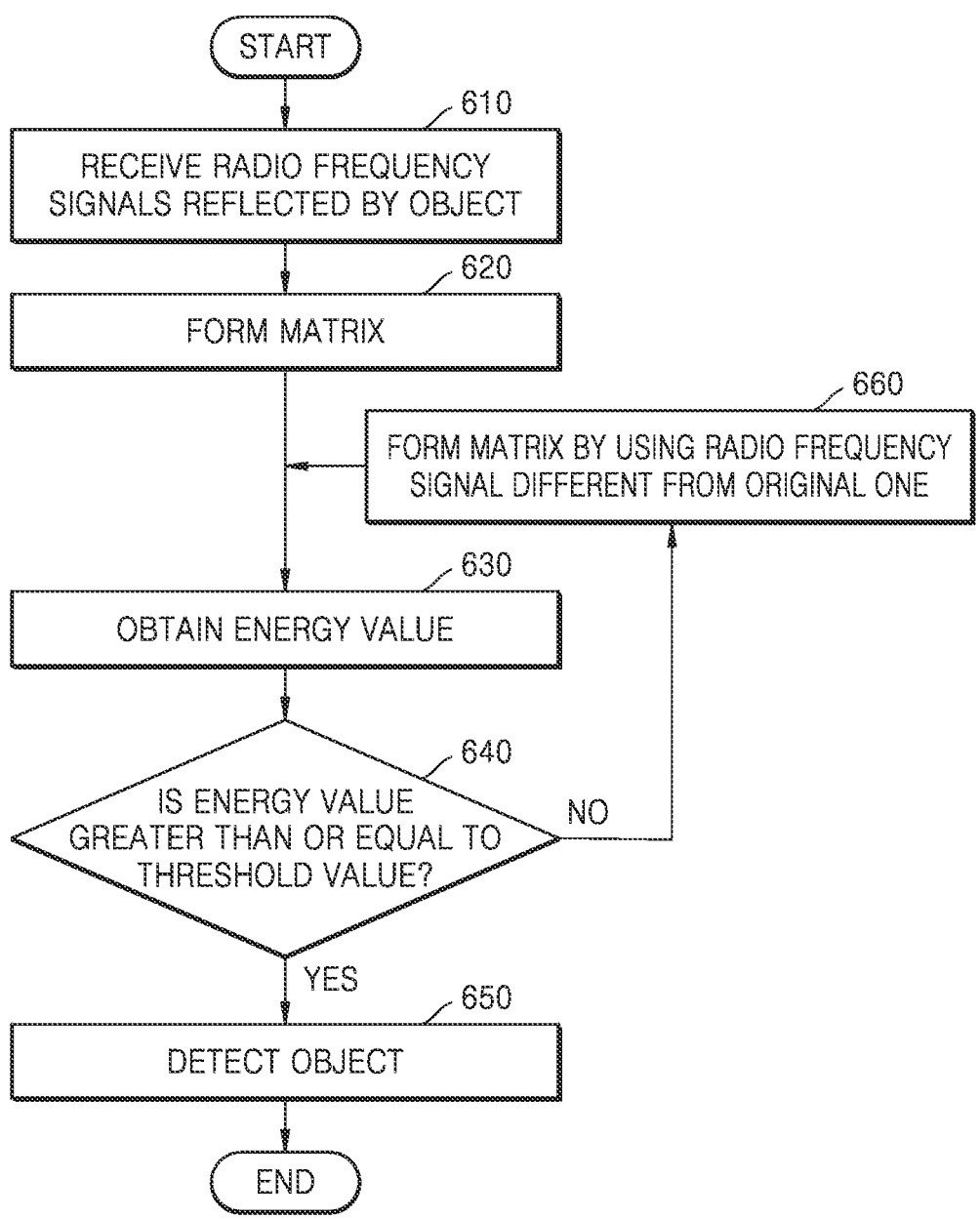
FIG. 6 illustrates an object detection method according to an embodiment of the disclosure.

FIG. 6 illustrates an object detection method according to an embodiment of the disclosure.

Referring to FIG. 6, the movable device 100 may transmit an RF signal to an object and receive a radio frequency signal reflected from the object at operation 610.

The movable device 100 may obtain a matrix by using a radio frequency signal at operation 620. To this end, the movable device 100 may digitize a certain number of radio frequency signals, for example, each of N (N is a natural number greater than or equal to 2) radio frequency signals from among received radio frequency signals. The movable device 100 may obtain a sequence of N samples by sampling a radio frequency signal and converting the samples into a digital form. Here, N is the number of signals included in a set among the reflected RF signals, which may be preset. The movable device 100 may obtain a matrix including each of the N sample sequences as a column. The N sample sequences may be arranged in respective columns in the order, in which radio frequency signals are received, and included in the matrix. A first row of the matrix may include a first sample of each digitized RF signal in the set.

The movable device 100 may obtain a resulting signal by summing samples of each row included in the matrix. The resulting signal may be obtained by summing the samples in each row of the matrix. The movable device 100 may obtain a whole energy value by summing each sample of the resulting signal at operation 630.

The movable device 100 may detect an object at operation 650 by comparing the energy value with a certain threshold value at operation 640. When the whole energy is determined at operation 640 to be higher than a predetermined threshold value, an object may be detected. The threshold value may be calculated empirically in a factory test stage with respect to a material of the surface on which the device moves. Before the movable device 100 is operated, a user may set a threshold value by selecting a threshold value corresponding to the material of the surface in settings of the movable device 100. Also, the movable device 100 may automatically set a threshold value while moving for a certain period of time, on a surface, on which there are no obstacles. When the threshold value is automatically set, the device having the RF sensor mounted thereon may be arranged in a space area at a distance of 0.5 m to 1 m where there are no obstacles/objects, which ensures the receipt of RF signals with no object contribution. The movable device 100 moves within this space area. While moving, the movable device 100 detects a low-profile object by an RF sensor.

The whole energy obtained while the movable device 100 has obtained by performing the above method while moving within the space area at a distance of 0.5 m-1 m where there are no obstacles/objects is set as the threshold value.

When the energy value is less than the threshold value, the movable device 100 forms a matrix by using other N radio frequency signals, instead of originally used N radio frequency signals at operation 660. That is, the movable device 100 performs an operation of excluding, from the set of N RF signals, an RF signal, which was first included in the set, and including a next RF signal that is received immediately after an RF signal included last in the set is received.

The movable device 100 repeats the above-described method again by using a newly formed matrix.

Figure 7:
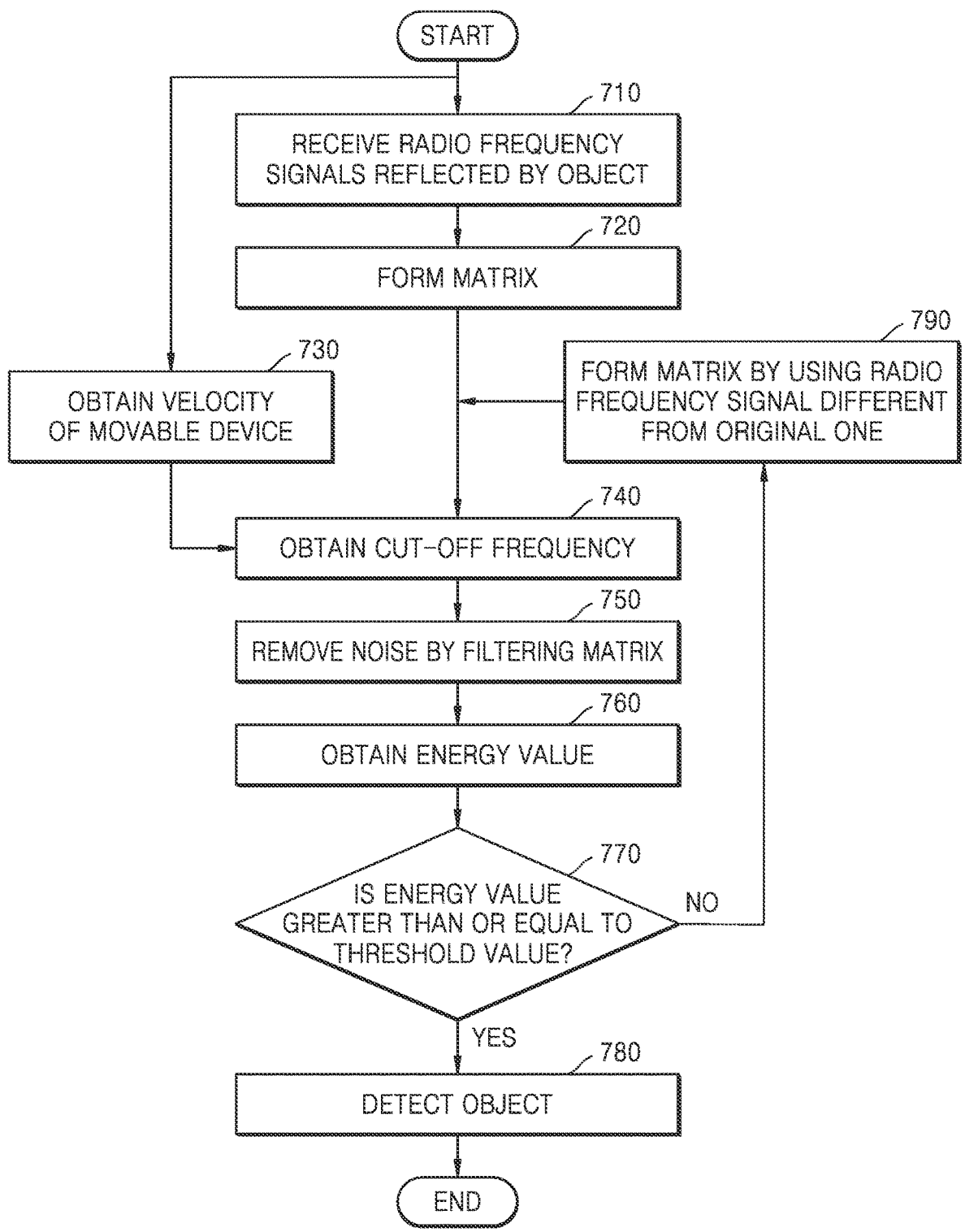
FIG. 7 illustrates an object detection method according to an embodiment of the disclosure.

FIG. 7 illustrates an object detection method according to an embodiment of the disclosure.

Referring to FIG. 7, the movable device 100 receives a radio frequency signal reflected from an object at operation 710. The movable device 100 may digitize N radio frequency signals among the received radio frequency signals to obtain N sample sequences, and form a matrix including each of the N sample sequences as a column in the order in which the radio frequency signals are received at operation 720.

The movable device 100 may obtain the velocity of the movable device 100 at operation 730. The movable device 100 may obtain velocity data from the movable device 100 or may obtain the velocity by any method known in the art.

The movable device 100 may calculate a cut-off frequency for noise removal by using the velocity of the movable device 100 at operation 740. Here, the cut-off frequency $F_{low}$ may be obtained through an experiment according to $$F_{low} = \frac{c \times FPS}{2 \times U \times F_S}.$$

Here, c is the light speed, FPS is the number of RF signals received per one second, U is the velocity of the movable device 100, and Fs is the sampling frequency of the received radio frequency signal.

The movable device 100 may remove noise by filtering the matrix by using a filter having a cut-off frequency $F_{low}$ at operation 750. The noise may include one or more of background noise and the effect of an object located beneath the surface, on which the movable device 100 moves, on a signal.

The movable device 100 may filter a signal of the matrix in a row direction, by a filter having a cut-off frequency calculated to remove background noise and the effect of an object on the signal. The movable device 100 may separately filter each row of the matrix. The filter used by the movable device 100 may be a pass band filter or a low pass filter. The filter used by the movable device 100 may be any known digital low pass filter, for example, one of a Chebyshev filter, an elliptical filter, a Bessel filter, or a Butterworth filter.

The movable device 100 may obtain a resulting signal by summing samples for each row in the matrix from which the noise has been removed, and obtain a whole energy value therefrom at operation 760.

The movable device 100 may determine whether the energy value is greater than or equal to a threshold value at operation 770, and when the energy value is greater than or equal to the threshold value, the movable device 100 may detect an object at operation 780.

When the energy value is not greater than or equal to the threshold value, the movable device 100 may modify the matrix. That is, the movable device may form a new matrix by using a radio frequency signal different from an original one at operation 790. Here, the newly formed matrix may also include N columns. The movable device 100 may form a new matrix by excluding, from the matrix, a sample sequence that is included first in a column among the N columns included in the matrix, and including an N+1th sample sequence column obtained from a radio frequency signal received N+1th.

The movable device 100 may repeat operation 740 and operations thereafter, by using the modified matrix.

Figure 8:
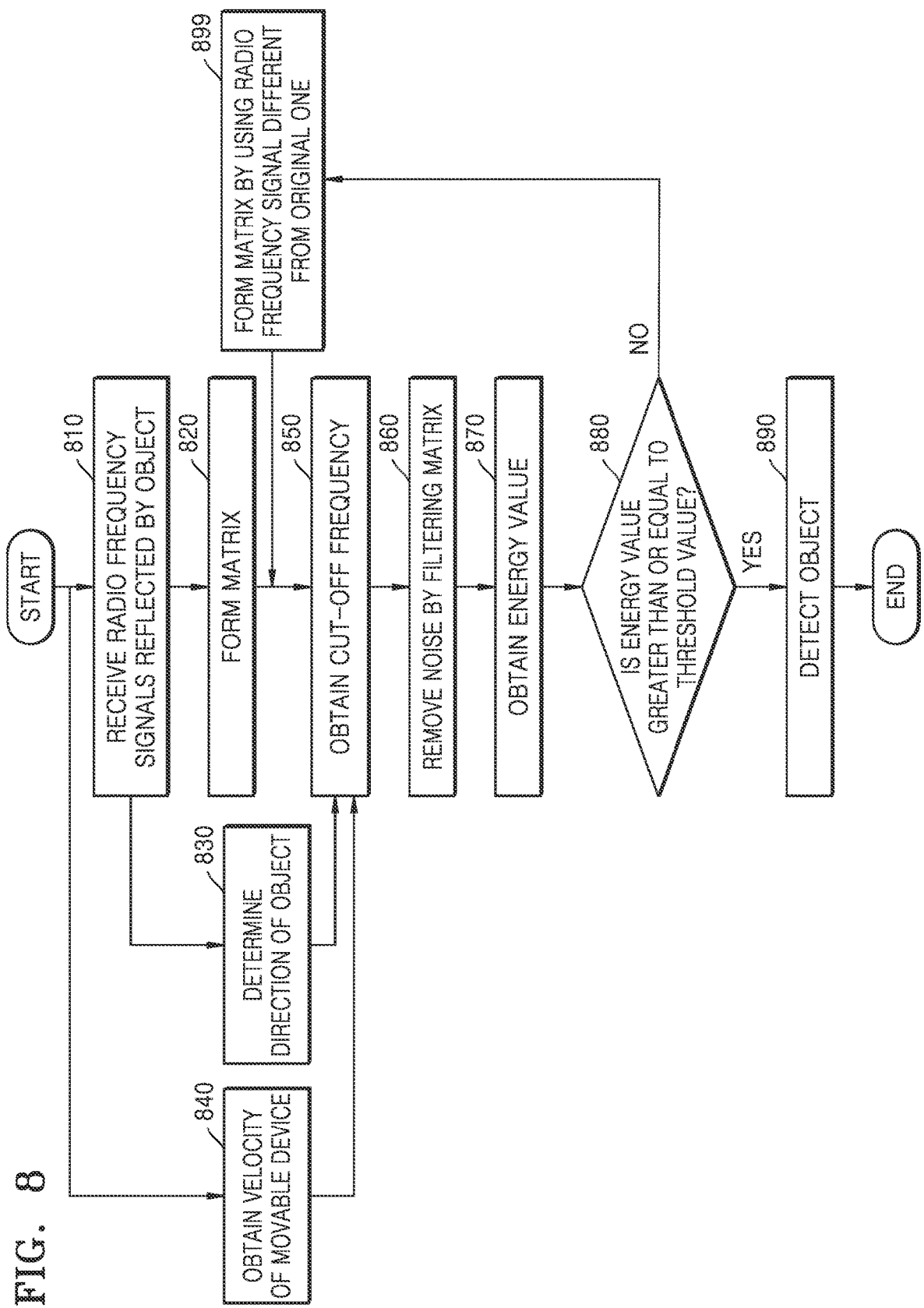
FIG. 8 illustrates a method of detecting an object, when a location of an object is different from a moving direction of a movable device, according to an embodiment of the disclosure.

FIG. 8 illustrates a method of detecting an object, when a location of an object is different from a moving direction in which a movable device moves, according to an embodiment of the disclosure.

Referring to FIG. 8, the movable device 100 may receive a radio frequency signal reflected from an object at operation 810, and digitize N radio frequency signals among received radio frequency signals to obtain N sample sequences, and form a matrix which includes, as a column, each of the N sample sequences in the order in which the radio frequency signals are received at operation 820.

The movable device 100 may determine a direction of an object by using the received radio frequency signals at operation 830. The movable device 100 may determine a direction of the movable device 100 with respect to the object by using the reflected RF signals. The movable device 100 may obtain an angle A between the direction of the object and the moving direction of the movable device 100.

The movable device 100 may obtain the velocity of the movable device 100 at operation 840.

The movable device 100 may calculate a cut-off frequency for noise removal by using the velocity of the movable device 100 and the direction of the object at operation 850. The movable device 100 may obtain a cut-off frequency of a low pass filter according to $$F_{low} = \frac{c \times FPS}{2 \times U \times \cos(A) \times F_S}.$$

Here, c is the light speed, FPS is the number of RF signals received per one second, U is the velocity of the movable device 100, Fs is the sampling frequency of the received radio frequency signal, and A is an angle between the moving direction of the movable device 100 and the object.

The movable device 100 may remove noise by filtering a matrix by using a filter having the obtained cut-off frequency at operation 860, and obtain a resulting signal by summing samples of each row of the matrix, from which noise is removed. The movable device 100 may obtain an energy value by summing samples of the resulting signal at operation 870, determine whether the energy value is greater than or equal to a certain threshold value at operation 880, and when the energy value is greater than or equal to the certain threshold value, the movable device 100 may detect an object at operation 890. When the energy value is not greater than or equal to the certain threshold value, the movable device 100 may form a matrix by using a radio frequency signal different from the original one at operation 899, and may perform operation 850 and operations thereafter by using the newly formed matrix.

Although not shown in FIG. 8, in an embodiment, the movable device 100 may further include calculating a location of the object relative to the device by using the velocity of the movable device 100 and the angle between the direction of the object and the moving direction of the device. It is widely known in the field of radar that the movable device 100 calculates a location of an object by using the velocity of the movable device 100 and the angle between the object and the moving direction of the movable device 100 by using an RF signal. Thus, no detailed explanation thereof is necessary.

In another embodiment, the movable device 100 further includes, in addition to the RF sensor, at least one additional sensor for object detection, wherein the at least one additional sensor may include one or more of a camera, a time-of-flight camera, a structured backlight camera, an ultrasonic sensor, and a capacitive sensor. The movable device 100 may further increase the object detection probability by adding and using a method of detecting an object by using an additional sensor, to the above-described method.

The above description of the embodiments is exemplary, and modifications to the configuration and implementation thereof do not depart from the scope of the description. Although the subject matter of the application is described in terms of structural features or linguistic features of methodological actions, it is understood that the subject matter of the application is not necessarily limited to the specific features or operations described above. Furthermore, the specific features and operations described above are disclosed as forms of implementing the claims. The application is not limited to the illustrated order of the steps of the method, and the order may be modified by those skilled in the art. Some or all of the steps of the method may be performed sequentially or in parallel.

Accordingly, it is assumed that the scope of the embodiments of the disclosure is defined only by the following claims.

The object detection method, performed by a movable device, according to some embodiments, may be implemented in the form of a recording medium including instructions executable by a computer, such as a program module executed by a computer. Computer-readable media can be any available media that can be accessed by a computer and includes both volatile and nonvolatile media, removable and non-removable media. Also, computer-readable media may include computer storage media and communication media. The computer storage media may include both volatile and nonvolatile, removable and non-removable media implemented in any method or technology for storage of information such as computer readable instructions, data structures, program modules or other data. The communication media may typically include a computer-readable command, a data structure, a program module, or other data of a modulated data signal, such as carrier waves, or other transmission mechanisms, and may include an arbitrary information transmission medium.

In addition, in the specification, a "unit" may be a hardware component such as a processor or a circuit, and/or a software component executed by a hardware component such as a processor.

In addition, the object detection method, performed by a movable device, according to the embodiments of the disclosure described above, may be implemented by a computer program product including a computer-readable recording medium by a computer having recorded thereon a program for executing the object detection method, performed by a movable device, the method including obtaining N sample sequences by digitizing N radio frequency signals (N is a natural number of 2 or more) from among the received radio frequency signals, obtaining a matrix including each of the N sample sequences as a column in an order in which the N sample sequences are received, obtaining a resulting signal by summing samples for each row of the matrix, obtaining an energy value from the resulting signal, and detecting the object in accordance with the energy value being greater than or equal to a certain threshold value.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A movable device for detecting an object, the movable device comprising:
   a radio frequency (RF) signal transmitter configured to emit first radio frequency signals;
   an RF signal receiver configured to receive second radio frequency signals reflected by an object, the second radio frequency signals being the first radio frequency signals reflected by the object;
   memory storing one or more computer programs; and
   one or more processors communicatively coupled to the RF transmitter, the RF receiver, and the memory,
   wherein the one or more computer programs include computer-executable instructions that, when executed by the one or more processors individually or collectively, cause the movable device to:
   obtain N sample sequences by digitizing N radio frequency signals, N being a natural number greater than or equal to 2, from among the second radio frequency signals received by the RF signal receiver,
   obtain a matrix including the N sample sequences as a column in an order in which the N sample sequences are received,
   obtain a resulting signal including samples of rows of the matrix,
   obtain an energy value from the resulting signal by summing the samples included in the result signal, and
   based on the energy value being greater than or equal to a threshold value, detect the object.

2. The movable device of claim 1, wherein the one or more computer programs further include computer-executable instructions that, when executed by the one or more processors individually or collectively, cause the movable device to:

based on the energy value being equal to or less than the threshold value, modify the matrix by excluding a sample sequence included in a first column of the matrix, and including a sample sequence column obtained from a radio frequency signal received after a last column of the matrix.

3. The movable device of claim 1, wherein the one or more computer programs further include computer-executable instructions that, when executed by the one or more processors individually or collectively, cause the movable device to:

obtain a velocity of the movable device; and
obtain, from the velocity of the movable device, a distance from the movable device to the object, to detect that the object is within the distance.

4. The movable device of claim 1, wherein the one or more computer programs further include computer-executable instructions that, when executed by the one or more processors individually or collectively, cause the movable device to:

obtain a velocity of the movable device;
remove noise by filtering samples included in the rows of the matrix, by using a filter having a cut-off frequency; and
obtain the energy value by summing the samples, from which the noise is removed.

5. The movable device of claim 4,
wherein the cut-off frequency is obtained according to a Formula:

$$F_{low} = \frac{c \times FPS}{2 \times U \times F_S},$$

where $F_{low}$ is the cut-off frequency of the filter, c is speed of light, FPS is a number of RF signals received per second, U is the velocity of the movable device, and Fs is a sampling frequency of the second radio frequency signals received by the RF signal receiver.

6. The movable device of claim 5, wherein the one or more computer programs further include computer-executable instructions that, when executed by the one or more processors individually or collectively, cause the movable device to:

individually filter the rows included in the matrix by using the filter having the cut-off frequency.

7. The movable device of claim 5, wherein the one or more computer programs further include computer-executable instructions that, when executed by the one or more processors individually or collectively, cause the movable device to:

remove, by using the filter, at least one of a signal from an object located beneath a surface, on which the movable device moves, or a vibration noise signal of the movable device.

8. The movable device of claim 5, wherein the one or more computer programs further include computer-executable instructions that, when executed by the one or more processors individually or collectively, cause the movable device to;

determine a direction of the object by using the second radio frequency signals received by the RF signal receiver; and correct the cut-off frequency to be:

$$F_{low} = \frac{c \times FPS}{2 \times U \times \cos(A) \times F_S},$$

according to the direction of the object,
where A is an angle between the direction of the object and a moving direction in which the movable device moves.

9. The movable device of claim 8, wherein the one or more computer programs further include computer-executable instructions that, when executed by the one or more processors individually or collectively, cause the movable device to:

detect a location of the object by using the velocity and the angle A.

10. The movable device of claim 1, further comprising:
an additional sensor configured to detect the object,
wherein the additional sensor comprises one or more of a camera, a time-of-flight camera, a structured backlight camera, an ultrasonic sensor, and a capacitive sensor.

11. An object detection method performed by a movable device, the object detection method comprising:

emitting, by the movable device, first radio frequency signals;
receiving, by the movable device, second radio frequency signals reflected by an object, the second radio frequency signals being the first radio frequency signals reflected by the object;
obtaining, by the movable device, N sample sequences by digitizing N radio frequency signals, N being a natural number greater than or equal to 2, from among the second radio frequency signals received by the movable device;
obtaining, by the movable device, a matrix including the N sample sequences as a column, in an order in which the second radio frequency signals are received;
obtaining, by the movable device, a resulting signal including samples of rows of the matrix;
obtaining, by the movable device, an energy value from the resulting signal by summing the samples included in the resulting signal; and
based on the energy value being greater than or equal to a threshold value, detecting, by the movable device, the object.

12. The method of claim 11, further comprising:
based on the energy value being equal to or less than the threshold value, modifying, by the movable device, the matrix by excluding a sample sequence included in a first column of the matrix, and including a sample sequence column obtained from a radio frequency signal received after a last column of the matrix.

13. The method of claim 12, wherein the modifying of the matrix comprises:
moving, by the movable device, each column of the matrix one by one left by excluding radio frequency (RF) signals from the matrix, in the order in which the RF signals are received.

14. The method of claim 11, further comprising:
obtaining, by the movable device, a velocity of the movable device;
obtaining, by the movable device from the velocity of the movable device, a distance from the movable device to the object; and detecting, by the movable device, that the object is within the distance.

15. The method of claim 11, further comprising:
obtaining, by the movable device, a velocity of the movable device; and
removing, by the movable device, noise by filtering samples included in the rows of the matrix, by using a filter having a cut-off frequency,
wherein the obtaining of the energy value comprises:
   obtaining, by the movable device, a resulting signal by summing samples for the rows of the matrix; from which the noise is removed, and
   obtaining, by the movable device, the energy value from the resulting signal.

16. The method of claim 15, wherein the filter comprises one or more of a Chebyshev filter, an elliptical filter, a Bessel filter, and a Butterworth filter.

17. The method of claim 11, wherein the threshold value is calculated empirically or experimentally in a factory test stage with respect to a material of a surface on which the movable device moves.

18. The method of claim 11, further comprising:
setting, by the movable device, the threshold value by selecting a threshold value corresponding to a material of a surface in settings of the movable device.

19. The method of claim 11, further comprising:
automatically setting, by the movable device, the threshold value based on the movable device moving for a certain period of time on a surface on which there are no obstacles.

20. One or more non-transitory computer-readable storage media storing one or more computer programs including computer-executable instructions that, when executed by one or more processors of a movable device individually or collectively, cause the movable device to perform operations, the operations comprising:
emitting, by the movable device, first radio frequency signals;
receiving, by the movable device, second radio frequency signals reflected by an object, the second radio frequency signals being the first radio frequency signals reflected by the object;
obtaining, by the movable device, N sample sequences by digitizing N radio frequency signals, N being a natural number greater than or equal to 2, from among the second radio frequency signals received by the movable device;
obtaining, by the movable device, a matrix including the N sample sequences as a column, in an order in which the second radio frequency signals are received;
obtaining, by the movable device, a resulting signal including samples of rows of the matrix;
obtaining, by the movable device, an energy value from the resulting signal by summing the samples included in the resulting signal; and
based on the energy value being greater than or equal to a threshold value, detecting, by the movable device, the object.

* * * * *